March 22, 1932.  A. R. GROSS  1,850,454
WELDING APPARATUS
Filed May 16, 1929  9 Sheets-Sheet 2
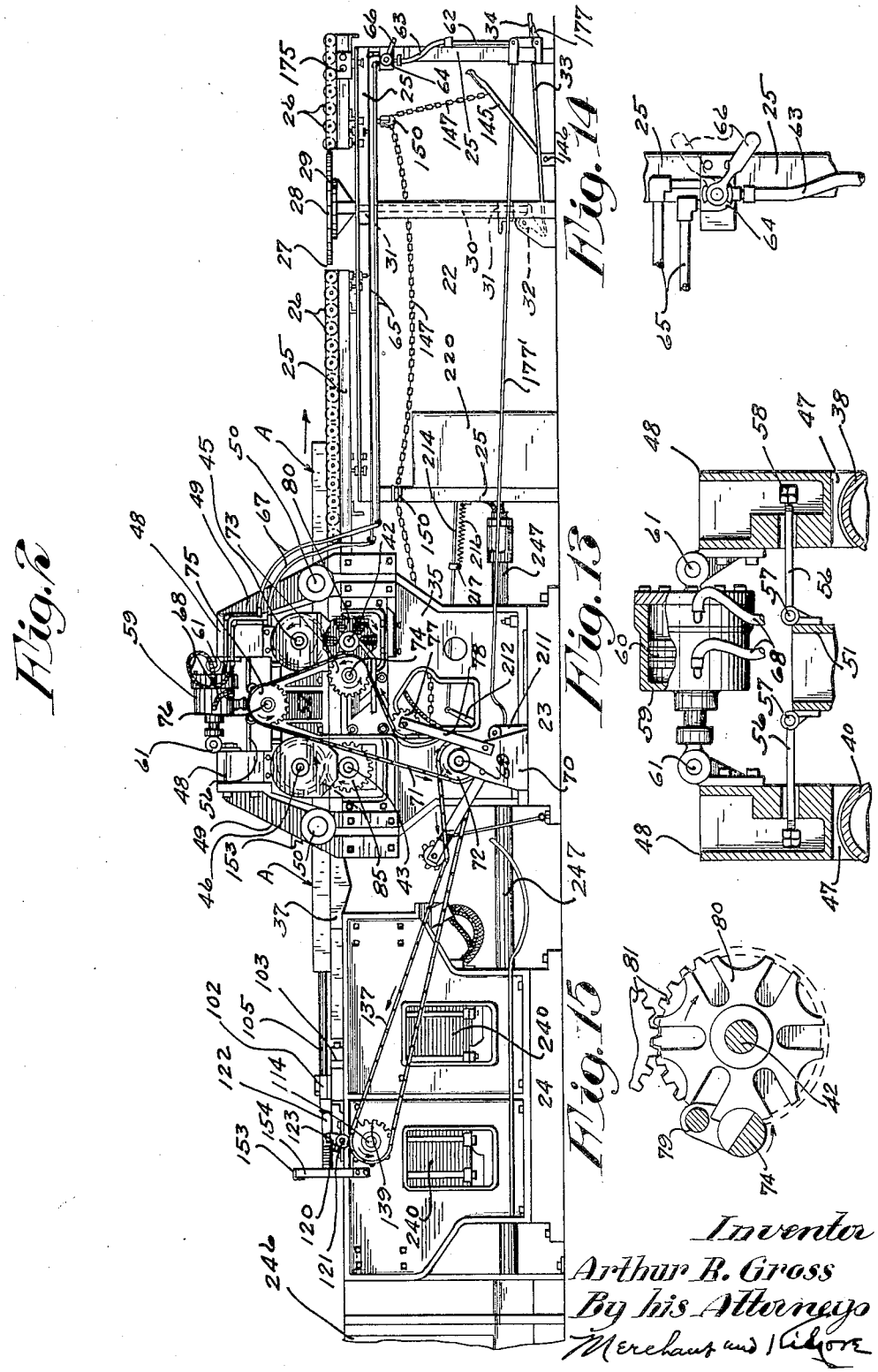
Inventor
Arthur R. Gross
By his Attorneys
Merchant and Kilgore

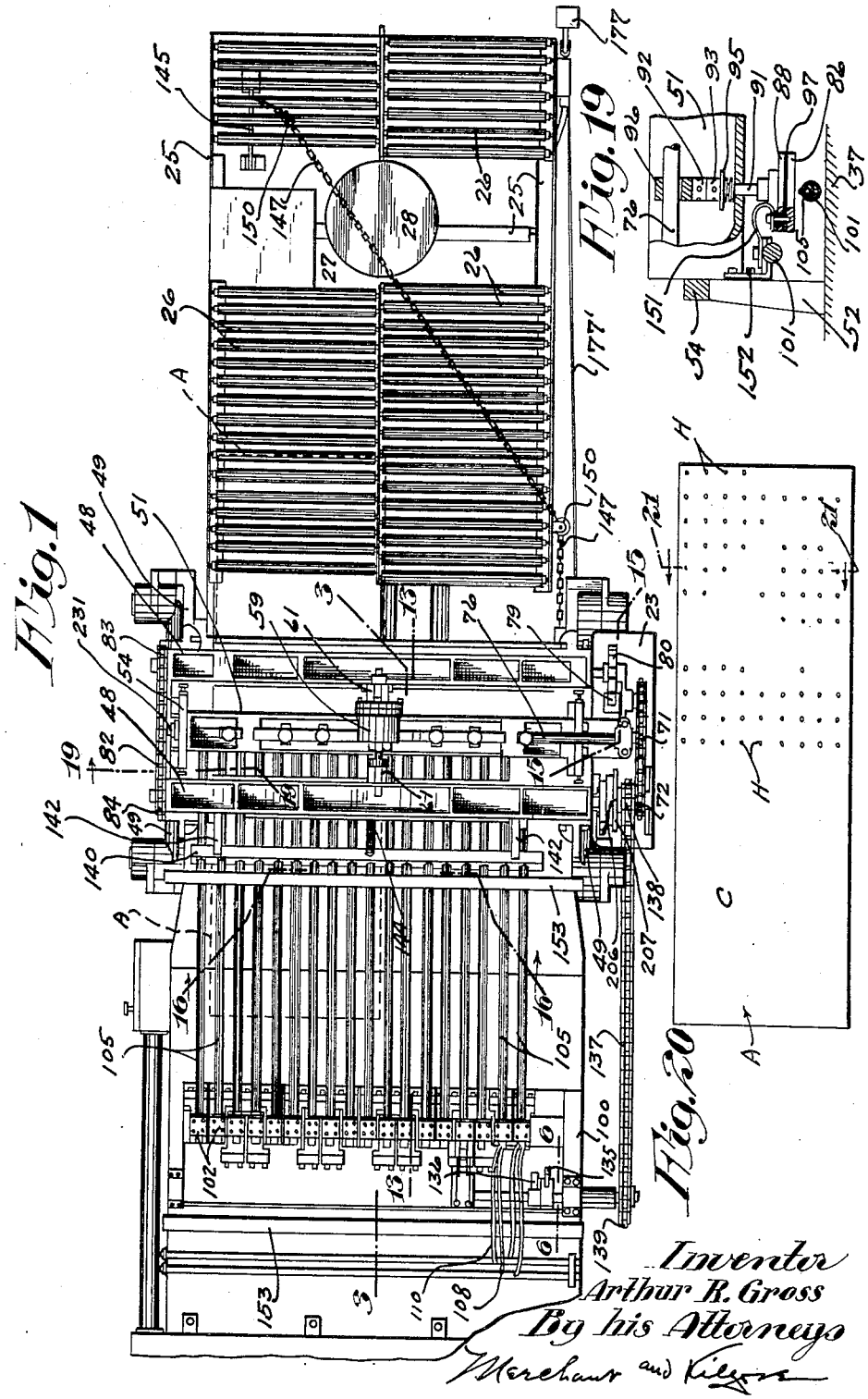

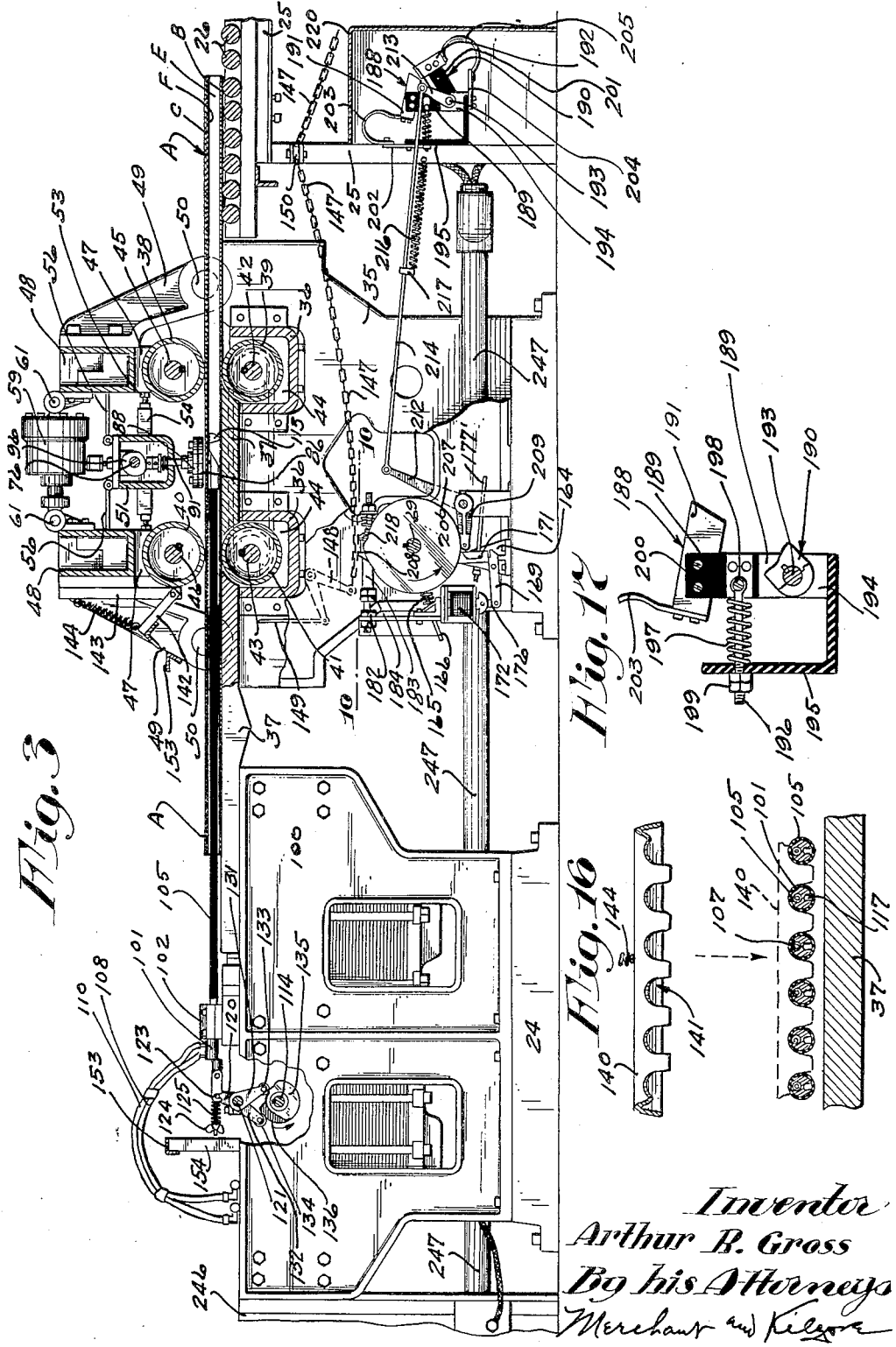

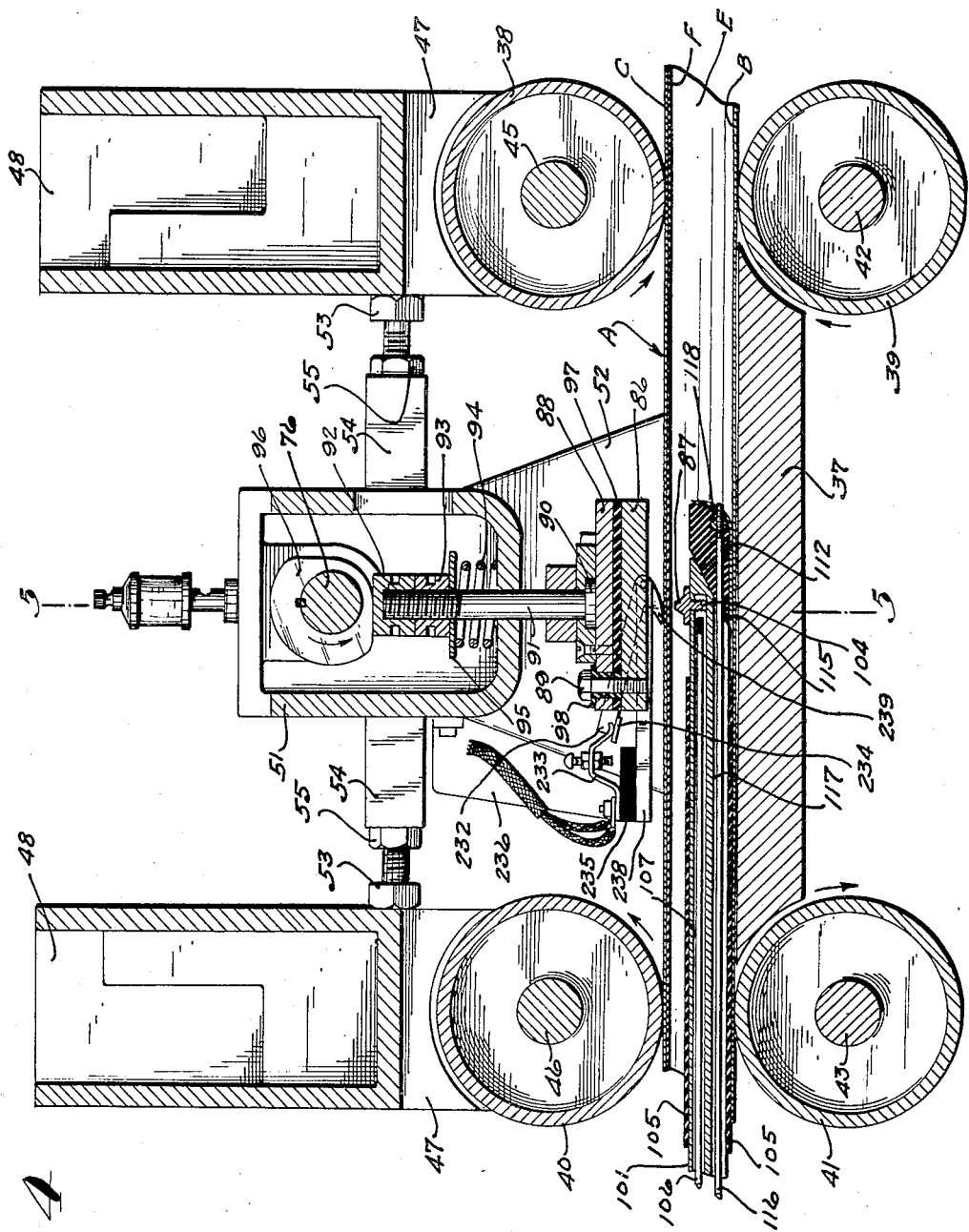

March 22, 1932. A. R. GROSS 1,850,454
WELDING APPARATUS
Filed May 16, 1929 9 Sheets-Sheet 5
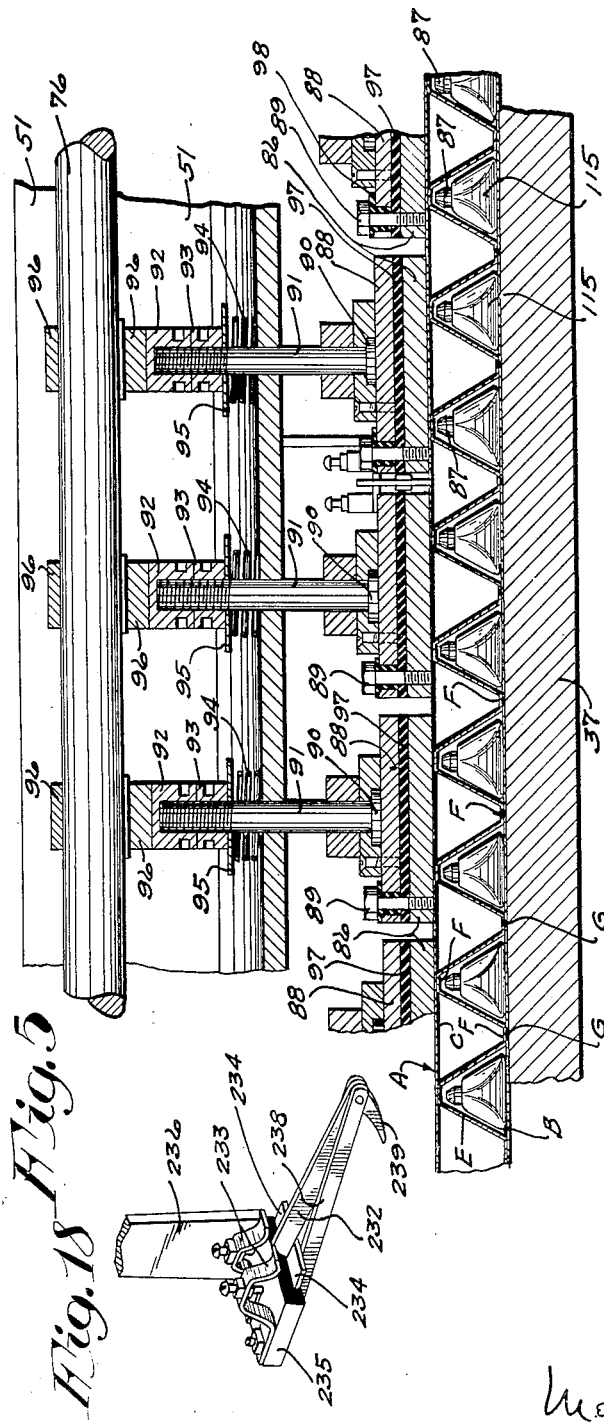
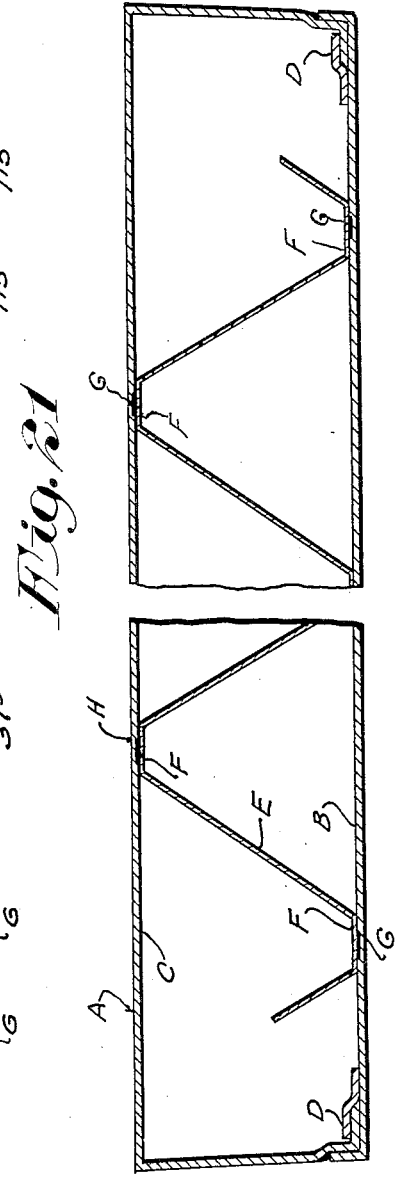
Inventor
Arthur R. Gross
By his Attorneys
Merchant and Kilgore March 22, 1932.   A. R. GROSS   1,850,454
WELDING APPARATUS
Filed May 16, 1929   9 Sheets-Sheet 6
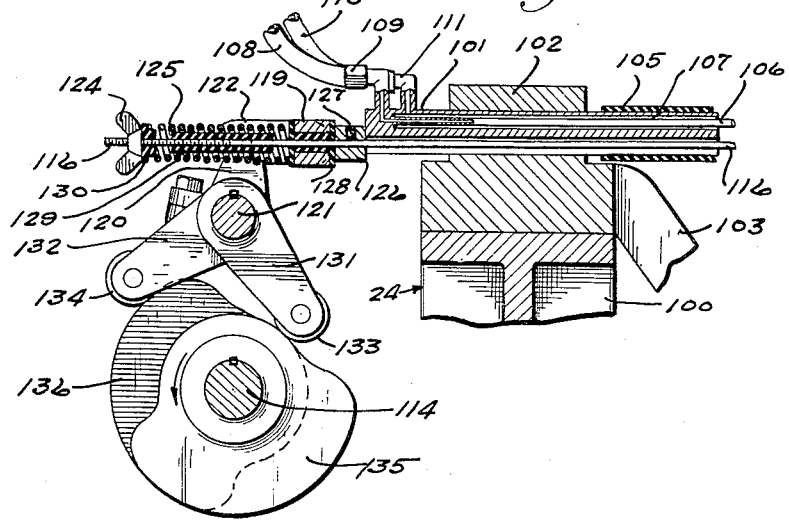
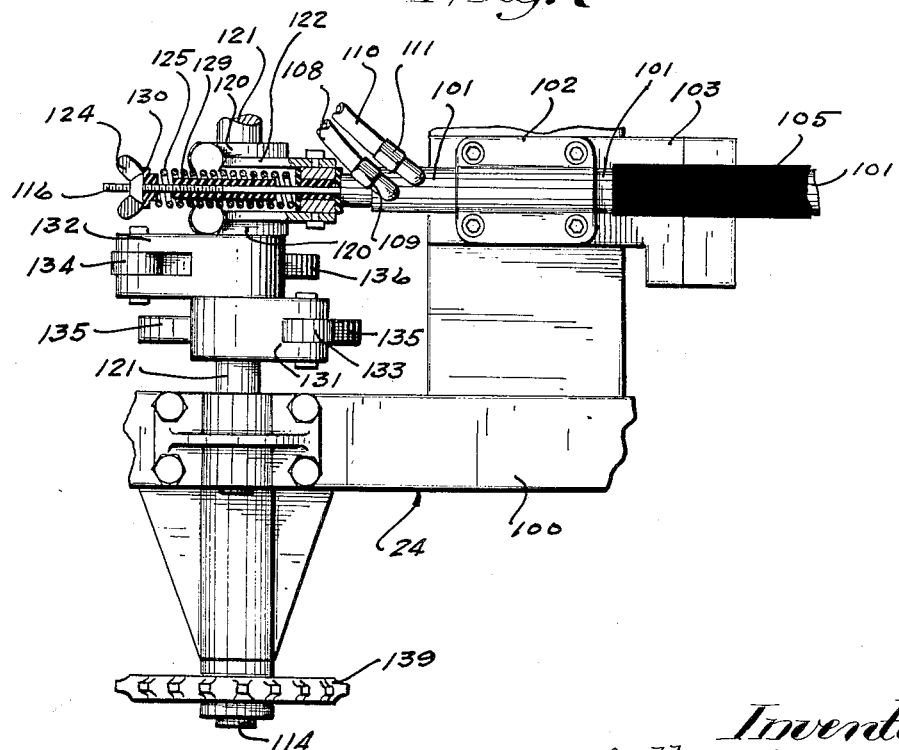
Inventor
Arthur R. Gross
By his Attorneys
Merchant and Kilgore March 22, 1932.  A. R. GROSS  1,850,454
WELDING APPARATUS
Filed May 16, 1929   9 Sheets-Sheet 7

Inventor
Arthur R. Gross
By his Attorneys
Merchant and Kilgore

March 22, 1932.  A. R. GROSS  1,850,454
WELDING APPARATUS
Filed May 16, 1929  9 Sheets-Sheet 8
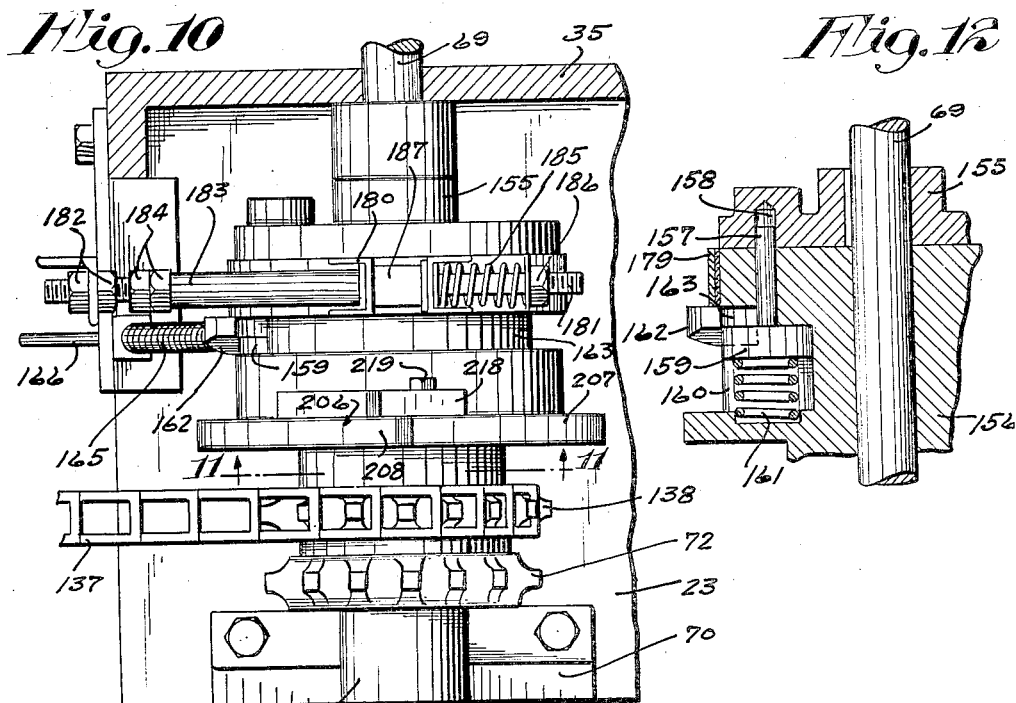
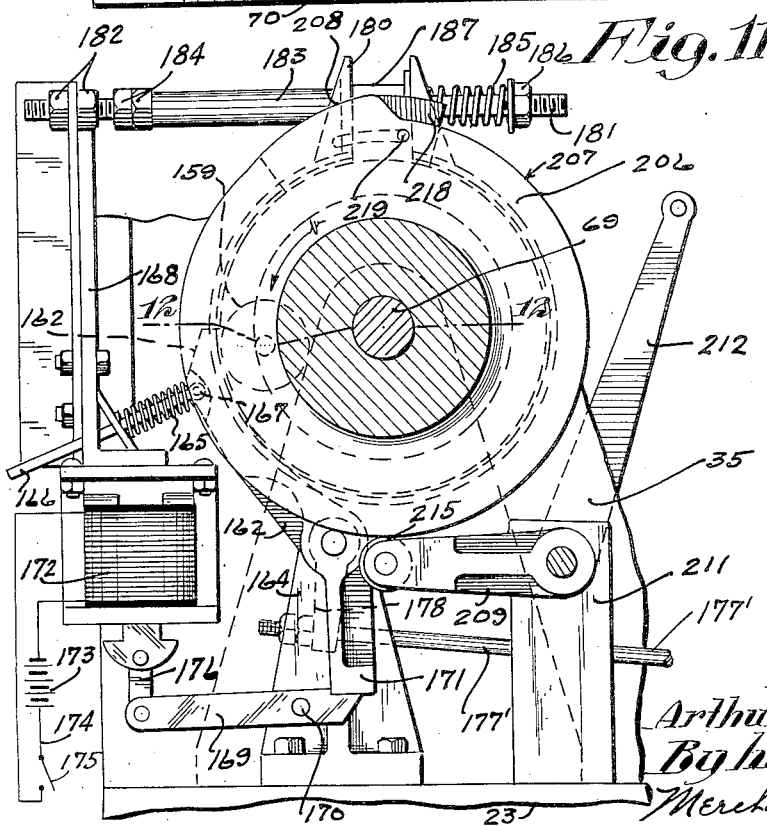
Inventor
Arthur R. Gross
By his Attorneys

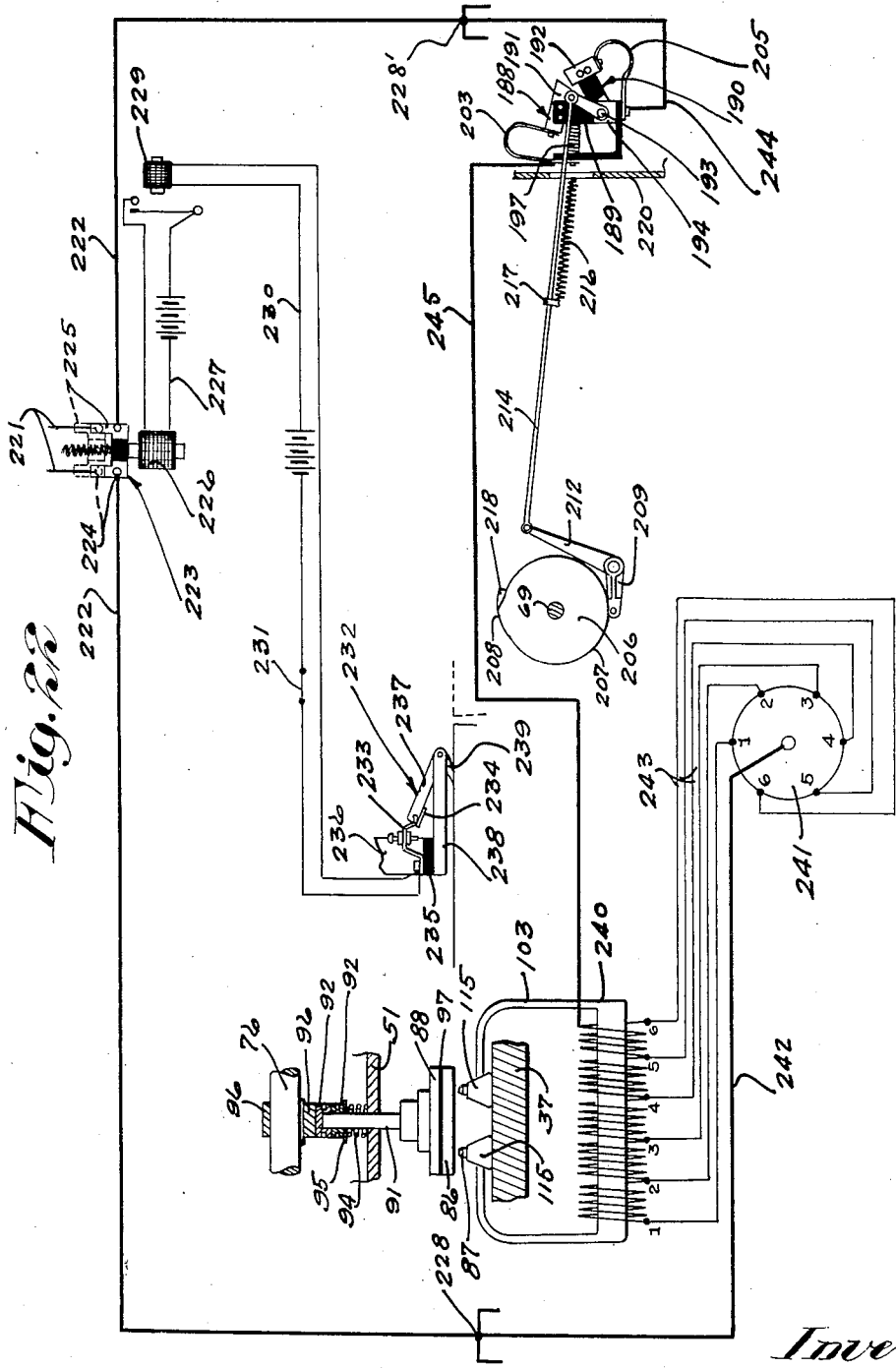

Patented Mar. 22, 1932

1,850,454

UNITED STATES PATENT OFFICE

ARTHUR R. GROSS, OF ST. PAUL, MINNESOTA, ASSIGNOR, BY MESNE ASSIGNMENTS, TO TRUSSBILT STEEL DOORS, INC., OF ST. PAUL, MINNESOTA, A CORPORATION OF DELAWARE

WELDING APPARATUS

Application filed May 16, 1929. Serial No. 363,488.

My present invention has for its object to provide a highly efficient welding apparatus intended for general use but especially well adapted, as illustrated, for internal use in welding hollow sheet metal units particularly of the type that are internally trussed as disclosed and broadly claimed in my copending application entitled "Hollow sheet metal unit" filed September 15, 1927 under Serial Number 219,643.

The objects of this invention, which are numerous, may better be explained with the illustration of the preferred apparatus for accomplishing the desired results. In some respects, this invention is in the nature of an improvement on or a modification of the invention disclosed and broadly claimed in my copending application entitled "Welding apparatus" filed July 2, 1927 under Serial Number 203,236 and formally allowed September 10, 1928.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a plan view of the improved internal welding apparatus with some parts broken away and other parts removed;

Fig. 2 is a left hand side elevation of the apparatus;

Fig. 3 is a view partly in left side elevation and partly in longitudinal vertical section taken on the line 3—3 of Fig. 1;

Fig. 4 is an enlarged view of the feeding and welding mechanism shown in Fig. 3;

Fig. 5 is a fragmentary view principally in transverse vertical section taken on the line 5—5 of Fig. 4;

Fig. 6 is a fragmentary detail view principally in section taken on the line 6—6 of Fig. 1, on an enlarged scale;

Fig. 7 is a plan view of the parts shown in Fig. 6;

Fig. 10 is a view partly in plan and partly in transverse horizontal section taken on the line 10—10 of Fig. 3, with some parts removed, on an enlarged scale;

Fig. 11 is a view principally in side elevation with some parts sectioned on the line 11—11 of Fig. 10;

Fig. 12 is a fragmentary detail view principally in section taken on the line 12—12 of Fig. 11;

Fig. 13 is a fragmentary detail view principally in section taken on the line 13—13 of Fig. 1, on an enlarged scale;

Fig. 14 is a fragmentary plan view of the air control valve and its connections;

Fig. 15 is a fragmentary detail view with some parts sectioned on the line 15—15 of Fig. 1, on an enlarged scale;

Fig. 16 is a detail view partly in elevation and partly in transverse vertical section taken on the line 16—16 of Fig. 1, on an enlarged scale;

Fig. 17 is a fragmentary detail view of one of the circuit breakers;

Fig. 18 is a perspective view of the actuating switch;

Fig. 19 is a view partly in elevation and partly in transverse vertical section taken substantially on the line 19—19 of Fig. 1, on an enlarged scale;

Fig. 20 is a plan view of a hollow sheet metal unit with the spot welding partly completed;

Fig. 21 is a fragmentary view in transverse section taken on the line 21—21 of Fig. 20, on an enlarged scale; and Fig. 22 is a wiring diagram.

Figure 8:
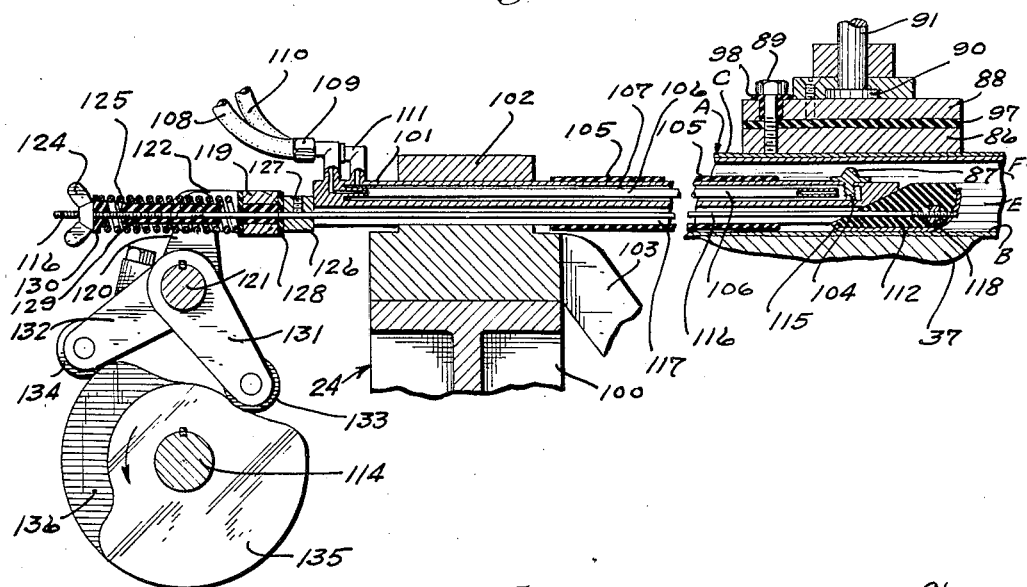
Figs. 8 and 9 are detail views illustrating the parts shown in Fig. 6 but in different positions and further illustrating the electrodes.

To illustrate one type of work for which the improved internal welding apparatus is especially well adapted to perform there is shown in the drawings a hollow sheet metal unit A of the slab type for a very wide and general use as a construction material for doors, walls, floors, roofs and the like. Said unit A is also well adapted for table tops and like structures. The unit A, as heretofore stated, is the subject matter of the copending application above identified.

By reference to Fig. 21 it will be noted that the unit A includes a pair of laterally spaced side plates B and C connected at their longitudinal edges by internal joints D preferably of the type that are interlocked by longitudinal sliding movement of one of said side plates in respect to the other. The unit A further includes an internal truss structure E comprising a corrugated metal sheet the apexes F of which are truncated and spot welded at G and H to the side plates B and C, respectively. In the construction of the unit A the side plate B is first welded to the apexes F on one side of the truss structure E, as indicated at G, and this welding is produced by an external welding apparatus which for the purpose of this case need not be considered. After the side plate B and the truss structure E have been connected by spot welding, as indicated at G, the side plate C is placed on the apexes F on the other side of said structure, slid longitudinally thereon to interlock the joints D and connect the two side plates B and C. Said plate C is then spot welded to the truss structure E, as indicated at H by the internal welding apparatus which is the subject matter of the present application. Preferably the sheet metal internal truss structure E is of a lighter gauge than the side plates B and C for a purpose which will hereinafter appear.

The improved internal welding apparatus, as shown, includes a work-supporting and handling section 22, a welding section 23 and a transformer section 24. The sections 22, 23 and 24 are longitudinally aligned with the welding section 23 between the sections 22 and 24, see Fig. 2.

*Work-supporting and handling section*

Referring now to the work-supporting and handling section 22, the same includes a frame 25 on which is mounted a table top 26 comprising a multiplicity of closely positioned idle rolls the upper faces of which are in the same horizontal plane. These rolls forming the table top 26 extend transversely of the section 22 and, as shown in Fig. 1, are arranged in two parallel and longitudinally extended rows with a longitudinally spaced gap 27 near the front of said table top. A turn-table 28 is mounted in the gap 27 at the transverse center of the section 22, see Figs. 1 and 2. This turn-table 28 is provided for turning the work, which will be hereinafter referred to as the unit A, over the table top 26 for aligning the same for feeding movement in the apparatus or for turning the same end for end for a purpose that will hereinafter appear. The turn-table 28 is swiveled to a head 29 on the upper end of a vertical shaft 30 turnably mounted in upper and lower bearings 31 on the frame 25. Normally the head 29 rests on the upper bearing 31 and supports the turn-table 28 slightly below the upper face of the table top 26 where the same is out of the way of the unit A during its feeding movement on said table top. The peripheries of the rolls forming the table top 26 and the upper face of the turn-table 28 are smooth so as to not mar or scratch the unit A.

The turn-table 28 is gravity-held in its inoperative position and to lift the same into an operative position in which its upper face extends above the table top 26 to permit the unit A thereon to be swung clear of the rolls, there is provided a rocking lifter 32 in the form of a short intermediately pivoted lever mounted on the frame 25 with one of its ends extending under the lower end of the shaft 30 and its other end connected by a link 33 to a foot pedal 34 at the front end of the frame 25 where the same may be easily operated.

*Welding section*

Referring now in detail to the welding section 23, the same includes a heavy frame structure indicated, as an entirety, by the numeral 35 with the exception of a pair of heavy transverse channel beams 36, that are laterally spaced longitudinally of the apparatus, and a welding table 37, see Figs. 3 and 4. This welding section 23 further includes a front pair of cooperating upper and lower combined feed and pressure rolls 38 and 39, respectively, and a rear pair of cooperating upper and lower combined feed and pressure rolls 40 and 41, respectively. These two pairs of rolls 38—39 and 40—41 are spaced longitudinally of the frame 35 and between which pairs of rolls the welding takes place, as will presently appear. The lower rolls 39 and 41 are keyed to shafts 42 and 43, respectively, which extend longitudinally through the two channel beams 36 and are journaled in bearings 44 which are rigidly secured in said beams. The welding table 37 extends from the front lower roll 39 rearward to a point in which it materially overlaps the transformer section 24 and the rear lower roll 41 works through an aperture in said table.

It is important to note that the upper faces of the two lower rolls 39 and 41 are slightly above the upper face of the welding table 37, say about 3/1000, so that the unit A is out of contact with said table and supported entirely on the lower rolls 39 and 41 during its feeding movement in the apparatus to prevent marring or scratching thereof. This distance, however, between the upper faces of the rolls 39 and 41 and the welding table 37 is not so great but that the unit A may be sprung onto the welding table 37 during welding action to cause said table to afford a base of resistance for the unit A, as will hereinafter appear.

The upper rolls 38 and 40 are keyed to shafts 45 and 46, respectively, journaled in depending bearings 47 on the under sides of a pair of transverse channel beams 48 which overlie the channel beams 36 and are vertically spaced thereabove. These beams 48 are carried by two pairs of upright arms 49 which at their lower ends are pivoted at 50 to upstanding bearing lugs on the frame 35 for movement toward and from each other longitudinally of the apparatus. A fixed channel beam 51 extends parallel to the beams 48, midway therebetween and is rigidly secured at its ends to a pair of relatively short pedestals 52 on the frame 35 at the sides thereof. These pedestals 52 support the beam 51 with its under side considerably above the welding table 37.

The approaching or downward movement of each upper roll 38—40 in respect to the lower rolls 39 and 41, respectively, is limited, and hence the swinging movement of the two pairs of arms 49 toward each other, by pairs of adjustable stops 53. These stops 53, as shown in Figs. 3 and 13, are in the form of horizontally extended headed bolts which have screw-threaded engagement with lugs 54 on the sides of the beam 51 and are held where adjusted by lock nuts 55. The stops 53 are arranged to be engaged by the opposing sides of the beams 48 and the bearings 47, see Fig. 4.

It may be here stated that in a relatively wide welding apparatus, as shown in the drawings, each roll 38, 39, 40 and 41 is made in two axially spaced sections with a central bearing between said sections for the respective shafts 42 and 46 so as to hold said rolls in true axial alignment and prevent springing thereof during the feeding movement of the unit A.

To limit the receding or lifting movement of the upper rolls 38—40 from the lower rolls 39 and 41, respectively, and hence the separating movement of the pairs of arms 49, adjustable stops 56 are provided, see Figs. 3 and 13. These stops 56, as shown, are in the form of eye bolts attached by horizontal pivot pins 57 to the sides of the beam 51 at the top thereof with their body portions loosely extending through bore-like apertures in the opposing sides of the beams 48 and have applied to their ends within said beams pairs of nuts 58. Obviously, these nuts 58 are engaged by the beams 48 during their separating movement and limit the lifting movements of the rolls 38 and 40.

An air cylinder 59 and a cooperating piston 60 is provided for drawing the pairs of arms 49 toward each other to press the rolls 38 and 40 onto the unit A or for separating said arms to lift said rolls to permit the unit A to be inserted between the pairs of rolls 38—39 and 40—41 or be removed from therebetween, see Figs. 2 and 13. It may be here stated that very little movement of the rolls 38 and 40 is required to press the unit A onto the rolls 39 and 41 or release the same. The pressure of the rolls 38 and 40 on the unit A is, of course, limited by the stops 53, which may be varied, at will, by adjusting the same.

Likewise the movement of the rolls 38 and 40 from the unit A is limited by the stops 56 which may be varied, at will, by adjusting the same. The cylinder 59 and its piston 60 connect the two beams 48 and hence indirectly connect the two pairs of arms 49. To permit the necessary movements between the cylinder 59 and the front beam 48 and between the stem of the piston 60 and the rear beam 48 said cylinder and piston are attached thereto by hinges 61 having horizontal pivots.

The piston 60 is reciprocated in the cylinder 59 by compressed air from a suitable air compressor, not shown, which is connected to the cylinder 59 on opposite sides of said piston by the following connections, to wit: A supply pipe 62 leading from said compressor is attached by a flexible hose 63 to a three-way valve 64 and said valve is connected to the cylinder 59, on opposite sides of the piston 60, by two pipes 65, see Figs. 2, 13 and 14. The valve 64 is mounted on the left hand side of the frame 25 at the front thereof and is provided with a handle 66 by which said valve may be manually controlled.

The pipes 65 are mounted in part on the frame 25 and in part on the front beam 48 and hence to permit the required oscillatory movement of the front beam 48 by the cylinder 59 and piston 60 flexible hose sections 67 are interposed in said pipes. To permit the required oscillatory movement of the front beam 48 and cylinder 59 in respect to each other the delivery ends of the pipes 65 are connected by flexible hose sections 68 to the cylinder 59 on opposite sides of the piston 60, see Figs. 2 and 13. The three-way valve 64 may be of any well known construction having an exhaust opening arranged when the cylinder 59 is being charged on one side of the piston 60 through one of the pipes 65 the air on the other side of said piston may exhaust through the other pipe 65 and said opening.

In positioning the unit A in the apparatus for welding, the same is manually fed between the pairs of rolls 38—40 and 39—41, when released, to the rear of said apparatus and then fed by said rolls toward the front of the apparatus and at which time the welding takes place. These pairs of rolls 38—40 and 39—41 are positively and intermittently driven to impart steps of movement to the unit A of a predetermined length to position said unit to be spot welded predetermined distances apart in a single row or a plurality of rows which extend longitudinally of the apparatus.

The driving connections for the rolls 38 to 41, inclusive, includes a power shaft 69 driven by an electric motor or any other suitable means, not shown. This driven shaft 69 extends transversely of the apparatus and is journaled in the frame 35 below the welding table 37 and in a bearing 70 on the left side of said frame. A sprocket chain 71 runs over a sprocket wheel 72 loose on the driven shaft 69 between the frame 35 and bearing 70, a sprocket wheel 73 on a shaft 74, for an intermittent gear or Geneva stop, journaled on the frame 35, a sprocket wheel 75 on a cam shaft 76 which extends longitudinally through the channel beam 51 and is journaled in the ends thereof and the bearings 52. Said sprocket chain 71 also runs over an idle guide sprocket wheel 77 on a shaft journaled on the frame 35 and a bracket 78 on the bearing 70. This intermittent gear includes the shaft 74 which is notched and cooperates with the convex outline of a notched wheel 80 and a crank 79 on said shaft which also cooperates with the wheel 80 to impart an intermittent movement thereto, see Fig. 15.

In the present apparatus the intermittent rotary movement imparted to the rolls 38 to 41, inclusive, by the Geneva stop is such as to impart steps of movement to the unit A, say of about 3 inches. The shaft 45 and hence the roll 38 is driven from the shaft 42 by intermeshing spur gears 81 on said shafts 42 and 45, and the shaft 46, and hence the roll 40 is driven from the shaft 45, by a sprocket chain 82 which runs over sprocket wheels 83 and 84 on the right hand ends of the shafts 45 and 46, respectively. The shaft 43 and hence the roll 41 are driven from the shaft 46 by intermeshing spur gears 85 on the left hand ends of said shafts 43 and 46. It may be here stated that the lifting movements of the rolls 38 and 40 from the rolls 39 and 41, respectively, is such that the gears of the pair 81 and the gears of the pair 85 never move out of mesh with each other.

The apparatus proper includes a plurality of welding units located between the pairs of rolls 39—40 and 39—41, spaced transversely of the apparatus in a row parallel to said rolls. Each welding unit, except the right-hand one, includes a single upper combined pressure device and secondary electrode or bridge member 86 and two lower primary electrodes or welding points 87 laterally spaced transversely of the apparatus for co-operation with said secondary electrode for welding in two rows and will hereinafter be referred to as the double row units, see Figs. 4 and 5. Said right-hand unit is for welding in a single row and hereinafter will be referred to as the single row unit. In this single row unit the outer or right-hand primary electrode 87 is dispensed with and the welding circuit completed through the arm 101 therefor, as will hereinafter appear. The secondary electrode 86 and the primary electrodes 87 are made from electrically conductive material such as copper and each secondary electrode 86 is in the form of a horizontally disposed disc having a smooth flat contact surface.

As above stated, the primary electrodes 87 are arranged in a single pair for each unit and connected to the opposite sides of an individual welding circuit. These cooperating primary electrodes 87 engage the metal or unit A to be welded at the same side thereof and the circuit through the metal unit A to be welded is closed between the primary electrodes 87 by the secondary electrode or bridge member 86, that is a good conductor of electricity. The relation of the parts C and F of the unit A is such that the path of resistance from the one primary electrode 87 to the other, directly through the lapped members C and F to be welded and through the secondary electrodes 87, is less than the resistance between the primary electrodes 87 on a path following the length through the members to be welded. With such arrangement it follows that the current taking the path of less resistance will flow through the path first noted and will be carried through the lapped members C and F to be welded. By carrying the current from one primary electrode 87 to the other through the secondary electrode or bridge member 86 the unit A will not be heated and remains cool.

The secondary electrode 86 performs another important function in that it is pressed onto the side plate C before the primary electrodes 87 are brought into engagement with the underlying apexes F, and the current to said primary electrodes 87 is turned on and then off before the secondary electrode 86 if lifted from the side plate C. By thus keeping the secondary electrode 86 in contact with the side plate C during the welding action and for a short time thereafter, said plate is prevented from lifting or bulging due to heat generated during the welding action and this keeps the outer face of the plate C smooth.

Before proceeding with a detail description of the operation of the secondary electrodes 86 and cooperating primary electrodes 87, it may be stated that after the unit A has been positioned by the rolls 38 to 41, inclusive, and the side plate C tightly pressed thereby onto the underlying apexes F, the secondary electrodes 86 are pressed onto the upper face of said side plate with sufficient force to press said side plate onto the underlying apexes F between the pairs of rolls 38—39 and 40—41 and to spring the unit A onto the welding table 37, which is only a very slight distance, and affords a firm base of resistance for said unit during the welding action of the side plate C onto the underlying apexes F. With the unit A thus held the pairs of primary electrodes 87 are raised against the under side of the upper apexes F with just sufficient force to press said apexes against the side plate C, which is held by the secondary electrodes 86 as a base of resistance, to close any air gaps between the plate C or apexes F, due to the springing or warping of either thereof, or both, and to insure proper welding contact between the primary electrodes 87 and apexes F. During the welding action, the primary electrodes 87 have their base of resistance on the side plate B.

In actual construction of the unit A, the truss structure E will be of a lighter gauge than that of the side plates B and C as fully set forth in the application heretofore identified. The relatively large secondary electrodes 86 distribute the electric current from the primary electrodes 87 over a relatively large surface surrounding the spots to be welded and thus prevent the outer surface of the side plate C from becoming too hot which would cause said surface to pucker or raise.

The primary electrodes 87 concentrate the heat therefrom in two spots on the relatively thin truss structure E and thereby cause the welding action to take place from the inside of the unit A before the outer surface of the side plate C becomes too hot. This method of welding is highly important for the reason that it leaves the outer face of the side plate C smooth. Heretofore a large amount of hand work has been necessary to finish the outer faces of welded units to smooth the same before a finishing coat could be applied and often a large amount of filling of the finishing material had to be applied to form a smooth finish.

Each secondary electrode 86 is detachably secured to a disc-like head 88 by a machine screw 89. By thus mounting the secondary electrode 86, it may be readily removed from the head 88 for the purpose of dressing its contact face or for substituting a new pad for an old one. Each head 88 is swiveled at its axis, as indicated at 90, to the headed lower end of an upright rod 91. This rod 91 extends radially from the axis of cam shaft 76 and works through a bore-like seat in the lower or transverse portion of the beam 51. A cap nut 92 is applied to the upper end of the rod 91 within the beam 51 and is held where set by a lock nut 93. Encircling the rod 91 is a coiled spring 94 compressed between the bottom of the beam 51 and a washer 95 on the rod 91 under the lock nut 93 and yieldingly holds the secondary electrode 86 raised.

For moving the secondary electrodes 86 downward into contact with the unit A and then releasing the same to be raised by the springs 94, the cam shaft 76 is provided with a plurality of cams 96 one for each of said electrodes. The springs 94 at all times hold the rods 91 with their nuts 92 in contact with the cams 96. By adjusting the cap nuts 92 on the rods 91, the secondary electrodes 86 may be vertically adjusted so that they may be forced onto the unit A with just the right amount of pressure.

It is important to note, by reference to Fig. 4, that the secondary electrodes 86 are insulated from the apparatus by a sheet of insulating material 97 interposed between said electrodes and its head 88 and by an insulating collar 98 on the bolt 89 where the same passes through said head. As the secondary electrodes 86 are being lifted from the unit A, at the completion of each welding action, said unit is given a step of forward movement and at this time the secondary electrodes 86, which are swiveled to turn about axes perpendicular to said unit, are given a slight rotary movement produced by friction between said unit and secondary electrodes. By thus turning the secondary electrodes 86 they always present different portions of their contact surfaces to the underlying primary electrodes 87 and thus increase the life of the secondary electrodes 86 or the length of time in which they have to be refinished.

As previously stated, the cam shaft 76 is driven by the sprocket chain 71 in the direction of the arrow marked thereon in Fig. 4 and in timed relation to the feeding action of the rolls 38 to 41, inclusive, which are driven in the direction of arrows marked thereon in said figure.

*Transformer section*

This section 24 includes a heavy frame 100 which supports the rear end portion of the welding table 37. Overlying the welding table 37 is a plurality of horizontal forwardly projecting and laterally spaced welding arms or adaptors, as shown eighteen, of any suitable electrically conductive material such as copper. These welding arms 101, which as shown in Fig. 16, are in the form of round bars, near their rear ends are rigidly but removably secured in pairs by two-part clamps 102 to pairs of transformer arms 103 on the cores of transformers one for each pair of welding arms 101, see Figs. 6 and 7. There are two of these welding arms 101 for each secondary electrode 86 and each thereof carries at its free or forward end one of the primary electrodes 87. Or in other words, there is a pair of arms 101 for each welding unit. The primary electrodes 87 have on their under sides depending stems 104 which are screwed into the welding arms 101 from the tops thereof and detachably secure said electrodes to the welding arms 101 so that they may be readily removed and refinished or a new point substituted for an old one, see Fig. 4.

A tubular jacket 105 of suitable insulating material is applied to each welding arm 101 and extends substantially the full distance between its clamp 102 and primary electrode 87, see Figs. 8 and 16. In view of the length of the welding arms 101 there is sufficient spring therein to permit their free end portions, which carry the primary electrodes 87, to be moved in all directions in a vertical plane and hence toward and from the secondary electrodes 86.

For cooling each arm 101 and its primary electrode 87 water is circulated in said arm and around the stem 104 of said electrode by a system which includes a water-delivery pipe 106 that extends axially through a conduit 107 formed in said arm above the axis thereof, see Figs. 4 and 6. This water pipe 106 is attached at its rear end to the arm 101 at the rear end of the conduit 107 and its delivery end terminates just short of the stem 104 so that water discharged from said pipe is delivered directly against the stem 104 and around the same. A flexible hose 108 leads from a suitable water supply, not shown, under the desired pressure and is attached by a coupling 109 to the arm 101 rearward of its clamp 102 and has communication with the intake end of the water pipe 106. The conduit 107 serves as a return conduit for the water which is discharged from said conduit through a hose 110 attached by a coupling 111 to the arm 101 just forward of the coupling 109.

The lateral spacing of the arms 101 corresponds to that of the corrugations in the truss structure E so that said arms enter said corrugations as the unit A is moved rearward in the apparatus with their primary electrodes 87 positioned under the upper truncated apexes F on which the side plate C rests, see Figs. 4 and 5. It will be noted that there is clearance between the truss structure E and the arms 101 and their primary electrodes 87 to permit the required raising and lowering movements of said arms and primary electrodes within the truss structure E.

To raise the free ends of the arms 101 and bring their primary electrodes 87 into contact with the under sides of the upper apexes F, a wedge block 112 or cam is positioned under the free end of each arm 101. By reference to Fig. 4 it will be noted that the free end of the arm 101 is beveled at 113 and has the same pitch as the contacting surface of the wedge block 112 for sliding engagement therewith. The wedge blocks 112 slidably rest on the side plate B as a base of resistance which, as previously stated, is held by the secondary electrodes 86 on the welding table 37. These wedge blocks 112 are automatically operated from a driven shaft 114 to lift the free ends of said arms and bring the primary electrodes 87 into contact with the under sides of the upper apexes F, see Fig. 4. As previously stated, the welding arms 101 have sufficient flexibility to permit raising and lowering movements of the primary electrodes 87 and the weight of said arms is sufficient to cause the same to follow the wedge blocks 112 as the same are moved from thereunder and thereby carry the primary electrodes 87 out of contact with the respective apexes F, see Figs. 4 and 8. It is important to note that the wedge blocks 112 are in cross-section of substantially the same shape as the corrugations in the truss structure E and thereby position the primary electrodes 87 at the transverse centers of the apexes F.

Each wedge block 112 is provided with a wearing shoe 115 which has a curved upwardly extended front end portion to cause the wedge block 112 to freely pass over the side plate B and enter one of the corrugations in the truss structure E, see Fig. 4. The connections for automatically operating each wedge block 112 from the driven shaft 114 includes a long rod 116 which extends loosely through a longitudinally extended groove 117 in the under side of the welding arm 101. The front end portion of the rod 116 extends completely and longitudinally through the wedge block 112 and its shoe 115 and has screw-threaded engagement with a nut 118 embedded in said wedge block. Obviously, by rotating the rod 116 in the nut 118, the wedge block 112 may be adjusted in different longitudinal positions on said rod.

To reciprocate the rods 116 for operating the wedge blocks 112 and thereby position the primary electrodes 87 in operative or inoperative positions in timed relation to the movements of the secondary electrodes 86 and the intermittent feeding movement of the rolls 38 to 41, inclusive, a square block 119 is slidably mounted on each rod 116 rearward of the arm 101 and releasably connected to a pair of upstanding crank arms 120 on a rock shaft 121 by a pair of hooks 122. These hooks 122 are pivoted to the block 119 at the sides thereof for vertical swinging movement, extend rearward therefrom and have detachably interlocking engagement with laterally projecting studs 123 on the free ends of the crank arms 120, see Figs. 3 and 7. A thumb nut 124 is adjustably applied by screw-threads to the rear end portion of each rod 116 and a coiled spring 126 encircles said rod between the block 119 and the thumb nut 124.

Figure 9:
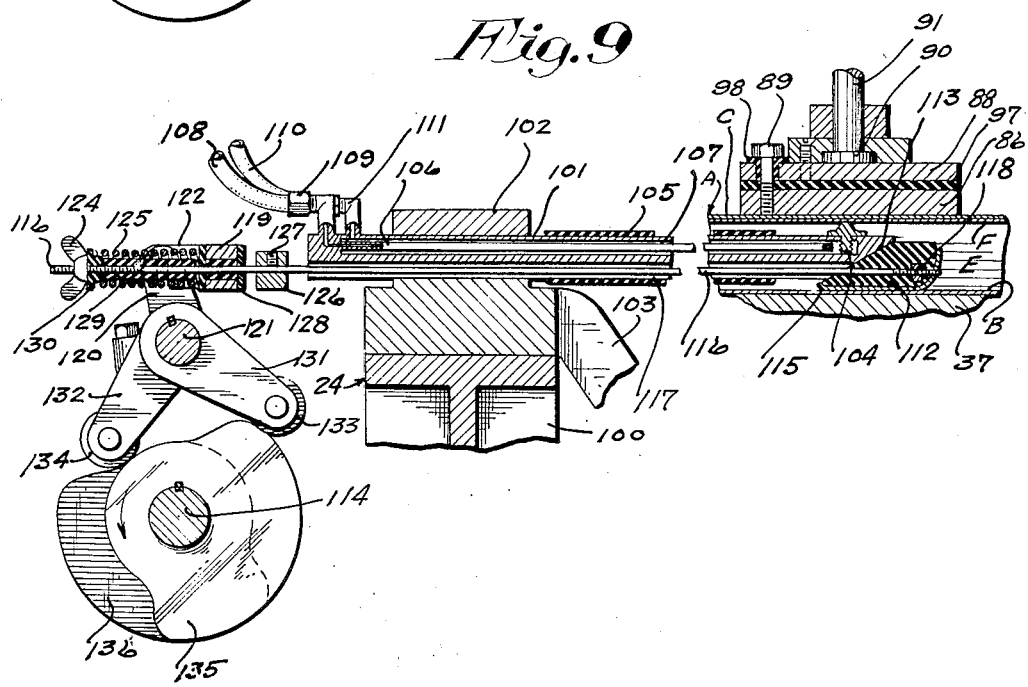

An adjustable stop collar 126 is applied to the rod 116 between the rear end of the arm 101 and the block 119 and is secured thereto in different adjustments by a set screw 127, see Fig. 9. The block 119 is insulated from the rod 116, spring 125 and stop 126 by a sleeve and a pair of washers 128 and the spring 125 is insulated from the rod 116 by a sleeve 129 and from the thumb nut 124 by a spring cap 130. The several elements 128, 129 and 130 may be of any suitable insulating material.

Both shafts 114 and 121 are journaled in the frame 100, extend transversely thereof in parallel arrangement, with the latter directly above the former, see Figs. 3 and 6. To operate the rock shaft 121 from the driven shaft 114 to reciprocate each rod 116 and hence the wedge block 112, there is keyed to said rock shaft a pair of downwardly extended arms 131 and 132 that extend substantially at right angles to each other and have on their free ends rollers 133 and 134, respectively, arranged to travel on a pair of laterally spaced peripheral cams 135 and 136, respectively, keyed to the shaft 114.

The shaft 114 is driven from the power shaft 69 by a sprocket chain 137 which runs over a sprocket wheel 138 loose on said shaft at the inner face of the sprocket wheel 72 and over a sprocket wheel 139 on the shaft 114, see Fig. 2. Each wedge block 112 is positively moved into an inoperative position to release the arm 101 and permit the same to drop by gravity to carry its primary electrodes 87 out of contact with the respective apex F by the engagement of the block 119 with the stop collar 126 on the rod 116. This movement of the block 119, is of course, imparted by the cam 136 acting on the arm 132 to rock the shaft 121 and thereby, through the connections 120 and 122, slide said block on the rod 116 until stopped by the collar 126 and further movement of said block will positively move the rod 116 to which the wedge block 112 is attached, see Fig. 8. Obviously, the stop collar 126 by its engagement with the rear end of the arm 101 limits the movement of the wedge block 112 into an inoperative position from under the arm 101, see Figs. 6 and 8. By reference to Fig. 9 it will be noted that the block 119 is held spaced from the stop 126 and the initial movement of said block by the arm 120 produces a hammer-like blow on the stop 126 to overcome the inertia of the wedge block 112 and thereby start its movement to an inoperative position.

The rearward or operative movement of the wedge block 112, to lift the arm 101 and carry its primary electrode 87 into engagement with the overlying apex F, is a yielding action produced by the spring 125. This operative movement of the wedge block 112 is imparted by the cam 135 acting on the arm 131 to rock the shaft 121 and slide the block 119 rearward on the rod 116 by the connections 120 and 122.

The rearward movement of the block 119 on the rod 116 will compress the spring 125 and thereby yieldingly draw the rod 116 and hence the wedge block 112 rearward to lift the arm 101 and carry its primary electrode 87 into contact with the overlying apex F. The tension of the spring 125 may be varied, at will, by adjusting the thumb nut 124 on the rod 116. When the resistance of the wedge block 112, in its lifting movement on the arm 101 to press the primary electrode 87 onto the overlying apex F, overcomes the spring 125 and further rearward movement of the arm 120 is imparted by the cam 135 said movement of the arm 120 will be in respect to the rod 116 due to the yielding action of the spring 125.

As the arms 101 at their front ends are loose and unsupported they are liable to get out of lateral adjustment so that they will not enter the corrugations in the unit A when said unit is moved rearward in the apparatus. To properly laterally space the free ends of the arms 101 prior to the moving of the same into the corrugations in the unit A there is provided a spacer 140 in the form of a vertically disposed flat bar which extends transversely of the apparatus and has formed in its lower edge portion a notch 141 for each arm 101. It will be noted that these notches 141 have downwardly diverging edge portions which, if any, of the arms 101 are out of alignment, engage the same with a cam action and move the arm or arms laterally so that all of the arms 101 are properly aligned. This spacer 140 has on its ends a pair of forwardly projecting arms 142 pivoted to hanger bars 143 on the rear side of the rear beam 48 and support said arms for vertical swinging movement to raise and lower the spacer 140. A coiled spring 144 anchored to one of the hanger bars 143 is attached to the spacer 140 and normally and yieldingly holds the same raised in an inoperative position.

The following manually operated connections are provided for depressing the spacer 140 against the tension of its spring 144, to wit: a foot pedal 145 is pivoted to a bracket 146 on the floor at the front end of the section 22 and connected by a chain 147 to one arm of a bell-crank 148, pivoted to the under side of the rear beam 36, and an upright link 149 connects the other arm of said bell-crank to one of the arms 142 of said spacer. Said chain 147 runs over guide sheaves 150 on the frame 25. To transversely space the arms 101 it is only necessary to operate the foot pedal 145 to depress the spacer 140 against the tension of its spring 144. In feeding the unit A to the arms 101 it may be edgewise shifted on the table 26 and lower feed roll 39 to align its corrugations therein with the arms 101.

Referring now to the single row welding unit which, in all respects, is identical with the double row welding units with the exception, as previously stated, that the primary electrode 87 for the right hand welding arm 101 is removed and the secondary electrode 86 is electrically connected to said arm by a spring contactor 151 to complete the welding circuit between the two arms of said single row unit through its primary electrodes 87 and secondary electrode 86 of said unit. By reference to Fig. 19 it will be noted that the contactor 151 is secured to the arm 101 from which the primary electrode 87 has been removed and to said secondary electrode.

The forward end of the right hand arm 101 of the single row unit is held stationary by a bracket 152 on the frame 35 and is insulated therefrom.

As illustrated in the drawings, there are eight double row welding units and one single row welding unit thus giving the apparatus the capacity of simultaneously welding in seventeen parallel rows. When welding a piece of work with a lesser number of rows than the capacity of the machine, say eleven rows, the first six left hand arms 101 are electrically detached from the apparatus by removing the same from their clamps 102 and by releasing the same from their crank arms 120 by the hooks 122. With said arms 101 thus released they are laid on a rack above the welding table 37, which comprises front and rear horizontal rails 153, without detaching their hose connections 108 and 110. The front rail 153 is mounted on the rear arms 49 close to their pivots so that said rail has very little movement during the oscillatory movement of said arms and the rear rail 153 is mounted on a pair of posts 154 on the frame 100. When welding a piece of work on an even number of rows the arms 101 of the single row unit will be electrically detached from the apparatus and laid on the rails 153 with certain of the double row units if not in use.

Referring again to the sprocket wheels 72 and 138 that are loose on the driven shaft 69, there is provided a clutch on said shaft for connecting said sprocket wheels thereto and completing the driving connection from said shaft to the rolls 38 to 41, inclusive, and the cam shafts 76 to 114, see Figs. 10 and 11. This clutch includes an inner annular member 155 keyed to the shaft 69 and an outer annular member loose on said shaft and having an outwardly extended hub on which the sprocket wheels 72 and 138 are rigidly secured for rotation therewith. The clutch member 156 is held against axial movement on the shaft 69 by the bearings and the clutch member 155. This clutch further includes a clutch pin 157 slidably mounted in a transverse seat in the clutch member 156 eccentric and parallel to the axis thereof and arranged to be projected into a seat 158 in the opposing face of the clutch member 155 to releasably connect the loose clutch member 156 thereto, see Fig. 12.

On the outer end of the clutch pin 157 is a relatively large disc-like head 159 which works in a peripheral recess 160 in the clutch member 156. A coiled spring 161 in the recess 160 is compressed between the clutch member 156 and the head 159 and is under strain to project the clutch pin 157 into its seat 158. To retract the clutch pin 157 and thereby release the clutch member 156 and hence the sprocket wheels 72 and 138 from the driven shaft 69 there is provided a cam finger 162 arranged to be moved into an annular channel 163 formed in the periphery of the clutch member 156 and into which channel the head 159 of said pin projects.

The cam finger 162 extends circumferentially around the clutch member 156 at the left side thereof, see Fig. 11, and is pivoted to a bearing 164 on the frame 35 at a point outward of the clutch member 156. Said cam finger 162 at its upper or free end portion is arranged to be projected into the channel 163 by a coiled spring 165 and is guided by a stem 166, one end of which is pivoted at 167 to the back of the cam finger 162 near the free end thereof. This guide stem 166 projects outward from the cam finger 162 substantially radially in respect to the axis of the shaft 69 and is mounted for endwise sliding movement in a bracket 168 on the frame 35. The coiled spring 165 encircles the guide stem 166 and is compressed between the cam finger 162 and the bracket 168 and is under strain to move said cam finger 162 into the channel 163. It is important to note by reference to Fig. 12 that the clutch head 159, when the clutch pin 157 is projected into the seat 158, extends into the channel 163 from the outer side thereof to be engaged by the cam finger 162 when in said channel. During the operation of the apparatus, the cam finger 162 is held inactive and out of the channel 163 by a pawl 169, intermediately pivoted at 170 to the bearing 164 and arranged to be engaged by a depending extension 171 on the pivoted end of the cam finger 162, see Fig. 11.

For operating the pawl 169 to release the cam finger 162 and permit its spring 165 to project said finger into the channel 163 to retract the cam pin 157 and release the sprocket wheels 72 and 138 from the shaft 69, there is provided a solenoid 172 in a simple circuit including a source of electrical energy 173, wires 174 and a manually-operated normally opened switch 175 on the frame 25 near the front end thereof. A link 176 connects the long end of the pawl 169 to the core of the solenoid 172. When the solenoid is de-energized the pawl 169 is gravity-held in an operative position and holds the cam finger 162 in an inoperative position, as shown in Fig. 11.

To stop the driving action of the sprocket wheels 72 and 138 the switch 175 is closed to complete the solenoid circuit to energize the coil of said solenoid and thereby raise the core thereof and move the pawl 169 into an inoperative position to release the cam finger 162, see Figs. 10 and 11. When the cam finger 162 is released, its spring 165 presses said finger into the channel 163 where the same will be engaged by the head 159 during the rotation of the clutch member 156, retract the clutch pin 157 and thereby release the clutch member 156 from the driven clutch member 155. Manually controlled connections are provided for moving the cam finger 162 out of the channel 163 to release the clutch pin 157 and allow the compressed spring 162 to move said pin into the seat 158 as the same is brought into registration with the clutch pin 157 during the rotation of the clutch member 155. These connections include a foot pedal 177 in the form of a bell-crank pivoted to the frame 25 at the front end thereof. A long rod 177" connects the foot pedal 177 to a depending arm 178 on the pivoted end of the cam finger 162. By depressing the foot pedal 177 the cam finger 162 is moved out of the channel 162 into an inoperative position in which the pawl 169 will re-engage the extension 171 under the action of gravity and hold the cam finger 162 inoperative.

To stop the rotation of the clutch member 156 and the sprocket wheels 72 and 138 when said clutch member is released from the clutch member 155, a brake band 179 is applied around the annular clutch member 156 between its channel 163 and the inner face of said clutch member 156. This brake band 179 is transversely divided and has on its ends outturned circumferentially spaced ears 180 having aligned holes through which a screw-rod 181 extends. Said rod 181 is anchored to the bracket 168 by having one of its end portions extend through a hole in said bracket and is rigidly but adjustably secured thereto by a pair of opposing nuts 182 on said rod. A sleeve 183 telescoped on to the rod 181 and adjustably held by an abutment 184, in the form of a pair of nuts on said rod, and engaged by the rear ear 180 on the brake band 179 to prevent movement of said brake band with the clutch member 156 which is rotated in the direction of the arrow marked on Fig. 11.

To yieldingly contract the brake band 179 onto the clutch member 156 a coiled spring 185 encircling the rod 181 is compressed between the front ear 180 and a nut 186 on said rod, see Figs. 10 and 11. A spacer 187 in the form of a block having a passage through which the rod 181 extends is interposed between the ears 180 to limit the contracting movement of the brake band 179 on to the clutch member 156. At the time the clutch member 156 is released from the clutch member 155 there is sufficient friction between the spring-projected head 159 and the cam finger 162 together with the action of the brake band 179 to stop the cam 206, positioned as shown in Fig. 11. In this position of the cam 206 the driving connections therefrom to the cam shafts 76 and 114 have positioned said shafts with the secondary electrodes 86 raised and the wedge blocks 112 inoperative to separate the primary electrodes 87 and the secondary electrodes 86. By changing the length of the spacer 187 the drag of the brake band 179 on the clutch member 156 may be varied, at will, so that the cam 206 will always stop in a predetermined position.

Welding circuits

There is a welding circuit for each double row welding unit and for the single row welding unit and includes an automatic circuit breaker 188. Each circuit breaker 188 comprises a pair of arms 189 and 190 having on their outer ends contact members 191 and 192, respectively, see Figs. 17 and 22. The arms 189 and 190 are mounted on a common horizontal rock shaft 193 which extends transversely through the frame 25 at the rear end thereof below the table 26. This rock shaft 193 is journaled in bearings 194 on the horizontal flange of a long angle bracket 195 the vertical flange of which extends upward and is rigidly secured to the rear legs of the frame 25 at the inner faces thereof, see Fig. 3. This angle bracket 195 is of suitable insulating material to insulate the bearings 194 and hence the rock shaft 193 from the apparatus. The arm 189 is loose on the shaft 193 for turning movement thereon and the arm 190 is keyed to said shaft for turning movement therewith. These arms 189 and 190 are held against axial movement on the shaft 193 by the respective brackets 194. The arm 189 is normally held from turning on the shaft 193 by an eye-bolt 196 pivoted at 198 to the arm 189, extends rearward therefrom through a bore in the vertical flange of the bracket 195 for endwise sliding movement, and has applied to its rear end a pair of nuts 199 which engage the back of the bracket 195 as a base of resistance. A spring 197 is compressed between the arm 189 and the vertical flange of the bracket 195 and yieldingly holds the contact member 191 projected toward the contact member 192.

Obviously, the bolt 196 and spring 197 will permit the arm 189 to be moved rearward or away from the arm 190, as will presently appear. The contact member 191 and the eye-bolt 196 are insulated from the arm 189 as indicated at 200 and the contact member 192 is insulated from the arm 190 as indicated at 201. Attached to the back of the vertical flange of the bracket 195 is a terminal plate 202 which is electrically attached by a yielding connector 203 to the rear end of the contact member 191. A terminal plate 204 is secured to the horizontal flange of the bracket 195 at the under side thereof and is electrically attached to the rear end of the contact member 192 by a yielding connector 205. As shown, the connectors 203 and 205 are in the form of sear springs and permit the required movements of the arms 189 and 190, respectively, during the making and breaking of the welding circuit through the circuit breaker. The two contact members 191 and 192 lie in the same plane and their inner ends are beveled so that they only have contact at their heels or lower corners to prevent arcing. It may be here stated that the arms 189 and 190 of all of the circuit breakers 188 are mounted on the rock shaft 193 for synchronized opening and closing movements.

For operating the rock shaft 193 from the driven shaft 69, there is formed on the idle clutch member 156 at the outer face thereof a circumferentially extended cam 206 having on its periphery a circumferentially extended neutral surface 207 which is relatively long, a circumferentially extended raised or active surface 208 for controlling the closing and opening of the circuit breakers 188, see Figs. 10 and 11.

The connections from the cam 206 to the rock shaft 193 includes a crank arm 209 keyed to the left hand end of a short rock shaft 210 journaled in bearings 211 on the base of the frame 35, a relatively long crank arm 212 keyed to the right hand end of the rock shaft 193, and a long rod 214 connecting the crank arms 212 and 213 at their outer ends, see Fig. 3. A cam roller 215 journaled on the free end of the crank arm 209 is arranged to run on the periphery of the cam 206. The crank arms 209 and 212 are in bell-crank arrangement and the crank arms 212 and 213 are substantially parallel.

A coiled spring 216 anchored to one of the front legs of the frame 25 and attached at 217 to the connecting rod 214 yieldingly holds the rock shaft 193 in a position to open the circuit breakers 188 and the arm 209 with its roller 215 in contact with the periphery of the cam 206, see Fig. 3. During the travel of the roller 215 on the neutral portion 207 of the cam 206 the circuit breakers 188 will remain open and the formation of the front end portion of the active cam surface 208 is such as to gradually lift the roller 215, move the contact member 192 into engagement with the contact member 191, and close the circuit breaker 188. The distance the contact member 192 is moved is such that after engaging the contact member 191, it moves the same about the rock shaft 193 and compresses the spring 197, thus insuring positive engagement between the contact members 191 and 192 of all the circuit breakers 188.

To vary the period of time in which the circuit breakers 188 are held closed, the cam 206 is provided with a circumferentially movable rear end section 218 that is rigidly but adjustably secured to said cam by a set screw 219 which extends through a slot in said extension and has screw-threaded engagement with the cam 206, see Figs. 10 and 11. It is important to note that the rear end of the cam extension 218 extends substantially perpendicular to the cam surface 207 where the same intersects said surface so that the roller 215, when passing from the active cam surface 208, drops abruptly to cause the contact members 192 to separate from the contact member 191 with a snap action and prevent arcing. A housing 220 is provided for the circuit breakers 188.

Referring now to the wiring diagram shown in Fig. 22, the numeral 221 indicates the wires of a power line leading from any suitable source of electrical energy and the numeral 222 indicates the wires of a main circuit. An automatic normally open supply switch 223 is provided for connecting the main circuit 222 to the power circuit 221 and comprises a pair of contacts for said power circuit, a pair of contacts for said main circuit, each pair of which is indicated by the numeral 224, and a pair of brushes 225 for connecting the contacts 224 of each pair. These brushes 225 are insulated the one from the other, attached to the core of a solenoid 226 in an electric circuit 227 and spring-held in an inoperative position. One wire 222 of the main circuit leads to a terminal 228 and the other wire thereof leads to a terminal 228'. The electric circuit 227 is of a lower potential than the supply circuit 221 and is normally broken by a relay switch 229, the core of which is in an electric circuit 230 of a potential still lower than that of the circuit 227.

The circuit 230 is provided with a manually-operated switch 231 that is normally closed and further includes a normally open actuating switch 232 arranged to be closed by the work or unit A while in the apparatus, see Fig. 18. This actuating switch 232 includes a pair of relatively fixed spring contacts 233 and a cooperating movable contact bar 234 which extends transversely of said contacts 233. The contacts 233 are mounted on an insulating block 235 secured to the lower end of a hanger bar 236 attached to the beam 51 and support the actuating switch 232 between two of the secondary electrodes 86, as shown in Fig. 5.

The contact bar 234 is carried on the free end of an arm 237 pivoted on the outer end of a forwardly projecting extension 238 on the under side of the insulating block 235. The weight of the contact bar 234 and the arm 237 is such that the same are gravity-held in a position in which the contact bar 234 is out of engagement with the contacts 233 to break the circuit therethrough. On the pivoted end of the arm 237 is a depending cam-acting finger 239 arranged to be engaged by the unit A as the same is fed between the front pair of rolls 38 and 39 and operated to lift the arm 237 and carry the contact bar 234 into engagement with the contacts 233 to complete the circuit therethrough. With the closing of the actuating switch 232 the coil of the relay switch 229 is energized, attracts its armature and thereby closes the circuit 227 which, in turn, energizes the solenoid 226 which attracts its core 224 and closes the supply switch 223.

For each welding unit of the apparatus there is a transformer 240 on the core of which are the arms 103 to which the two arms 101 of said unit are attached by the clamps 102, and a voltage regulator 241 connected by a lead wire 242 to the terminal 228. Wires 243 lead from the voltage regulator 241 to the winding of the transformer 240. A lead wire 244 for each circuit breaker 188 leads from the terminal 228' to the contact plate 204 and a second lead wire 245 leads from each contact plate 202 to the winding of the transformer 240. The supply switch 223, the relay switch 229 and the voltage regulator 241 are all mounted in a housing 246 at the rear of the section 24 and the main circuit 222 is carried in a conduit 247 to the rear end of the section 22 where the lead wires 244 are connected and lead to the several circuit breakers 188, see Figs. 2 and 3.

In order to weld long units and at the same time keep the arms 101 to a minimum of length, the unit A is manually fed into the apparatus to the rear thereof and the welding started at the longitudinal center of the unit A and the inner half thereof welded during the feeding movement of said unit toward the front end of the apparatus. At the completion of the welding of the inner half of the unit A, said unit is drawn forward on the table top 26 over the turn-table 28, turned thereby end for end and again fed into the apparatus and the other half of said unit welded in a similar manner by starting at the longitudinal center thereof.

It will be noted by reference to Fig. 20 that the unit A has nine rows of welding that are complete for one-half of the length of the unit A, hence, the truss structure E has nine truncated apexes F, partly welded to the side plate C. As the unit A is being welded in only nine rows, the operator removes all of the arms 101 from the transformer arms 103 with the exception of the first ten at the right of the welded apparatus, thus leaving the two arms of the single row unit, which are at the extreme right of the apparatus, and the adjacent four pairs of arms 101 of the double row units. The arms 101 detached from the transformer arms 103 are placed on the rack 153 where they are out of the way. The arms 101, remaining on the welding table 37, are then laterally positioned by the spacer 140 as previously described.

Operation

The operation of the above described internal welding apparatus may be briefly described as follows: Normally the switches 175, 223, 229 and 232 and the circuit breakers 188 are all open, and there is no current to the apparatus as the supply switch 223 is open. The clutch pin 157 is held inoperative by the cam finger 162 to release the clutch member 156 and render the driving connections therefrom to the rolls 38 to 41, inclusive, and the cam shafts 76 and 114 inactive. The secondary electrodes 86 are held raised by the springs 94 and the wedge blocks 112 are in inoperative positions, the arms 101 gravity-held thereon with their primary electrodes 87 drawn away from the secondary electrodes 86, see Figs. 4, 5, 6 and 7. The valve handle 66 is positioned as shown by full lines in Fig. 14 to hold the upper feed rolls 38 and 40 raised.

At the time the unit A is delivered to the above apparatus for welding the side plate C thereto, said unit is all assembled by having its side plate B welded to the apexes F on one side of the truss structure E, and the side plate C is attached to said plate B by the joints D. This incomplete unit A is placed on the table top 26 with the side plate C uppermost. The unit A is then positioned by the turn-table 28 in longitudinal alignment with the apparatus and manually fed between the feed rolls 38 to 41, inclusive, to the rear of this machine, with its longitudinal center between the secondary electrodes 86 and the primary electrodes 87.

During the manual movement of the unit A to the rear of the apparatus, the wearing shoes 115 direct the wedge blocks 112, and hence the arms 101 and their primary electrodes 87 into the corrugations having the apexes F on which the plate C rests. With the unit A thus positioned, the valve handle 66 is moved from its full line position to its dotted line position, see Fig. 14, to lower the upper feed rolls 38-40 onto the side plate C and press the same onto the underlying apexes F.

As the unit A is being manually fed into the apparatus, the side plate C engages the cam finger 239 and operates the same to close the actuating switch 232. With the closing of the actuating switch 232, the coil of the relay switch 229 is energized, attracts its armature which closes said switch and completes the circuit 227, to energize the solenoid 226 and thereby attracts its core to close the supply switch 223. With the closing of the switches 234, 229, and 223, all of the welding circuits in use are closed, except where broken between the secondary electrodes 86 and co-operating primary electrodes 87 and the circuit breakers 188.

After the unit A is positioned in the apparatus, as just described, the motor for operating the driving shaft 69 is started and the valve handle 66 is moved from its full line position to its dotted line position, see Fig. 14, to lower the feed rolls 38-40 onto the unit A to press the side plate C onto the underlying apexes F and clamp the unit A between the pairs of feed rolls 38-39 and 40-41 for intermittent feeding action. The foot pedal 177 is next depressed to operate the cam finger 162 to release the clutch pin 157 and connect the clutch member 156 to the clutch member 155 and operate the driving connections for imparting intermittent rotary movement to the rolls 38 to 41, inclusive, and for rotating the cam shafts 76 and 114 and the cam 206. At the time the cam finger 162 is manually operated to release the clutch pin 157 the pawl 169 automatically engages the extension 171 and holds said cam finger in an inoperative position.

From now on the action of the welding apparatus is entirely automatic and each cycle of welding operation is as follows:

1. The synchronized secondary electrodes 86 are forced onto the unit A by the cams 96 which press the side plate C onto the underlying apexes F and spring said unit, between the lower rolls 39 and 41, onto the welding table 37, see Figs. 5 and 8. The synchronized wedge blocks 112 are moved by the cams 135 under the welding arms 101 which lift the same and bring the primary electrodes 87 into contact with the overlying surfaces of the apexes F with just the right amount of pressure, which is controlled by the springs 125, to produce proper welding contact with said apexes and to press said apexes onto the side plate C in case there are slight air gaps therebetween, see Fig. 9. The timing of the cams 96 and 136 is such that the secondary electrodes 86 are first brought into contact with the side plate C and immediately thereafter the primary electrodes 87 are brought into contact with the overlying apexes F for a purpose heretofore fully explained.

2. The roller 215 of the crank arm 209 is engaged by the active cam surface 208 on the cam 206, closes the circuit breakers 188 and completes the welding circuits to the primary electrodes 87 through the secondary electrodes 86 for a predetermined period of time which is controlled by the passing of the active cam surface 208 out of engagement with the roller 215. As the active cam surface 208 moves out of contact with the roller 215 the spring 216 opens the circuit breakers 188 with a snap action.

3. The cams 136 move the wedge blocks 112 into inoperative positions and permit the arms 101 to drop by gravity and carry the primary electrodes 87 out of engagement with the overlying apexes F and thereafter the cams 96 release the secondary electrodes 86 and permit the springs 94 to move the same into inoperative positions.

4. The crank 79 of the Geneva stop engages the notched wheel 80 and imparts a step of rotary movement to the feed rolls 38 to 41, inclusive, and thereby moves the unit A a step forward in the apparatus to position the same from the next welding action or cycle.

At the completion of the welding of one-half of the unit A the same passes from under the cam finger 239 and allows the contact bar 234 to drop by gravity and thereby open the actuating switch 232 and break the circuits through the relay switch 229 and supply switch 223. Also at the completion of the welding action of one-half of the unit A the switch 175 is closed to complete the circuit for the solenoid 172, release the pawl 169 and allow the spring 165 to project the cam finger 162 into the path of movement of the head 159 to retract the clutch pin 157 and thereby disconnect the clutch member 156 from the driving clutch member 155 and stop the driving connections from the clutch member 156 to the rolls 38 to 41, inclusive, the cam shafts 76 and 114 and the rotation of the cam 206.

Briefly stated, the unit A is first clamped between the rolls 38 to 41, inclusive, next the secondary electrodes 86 are pressed onto the plate C of said unit and thereafter the cooperating primary electrodes 87 are positioned against the overlying apexes F with a welding contact, next the welding circuits for the primary electrodes 87 are completed for a predetermined period of time and then broken, next the primary electrodes 87 are moved away from the unit A and thereafter the secondary electrodes are moved away from the respective apexes F and finally a step of movement is imparted to the unit A to position the same for the next welding action or cycle.

What I claim is:

1. In a welder, a welding circuit having a pair of spaced primary electrodes arranged to engage the same side of a pair of plates to be welded, a single secondary electrode arranged to engage the opposite side of the plates from the primary electrodes and connect the primary electrodes in series, and for passing an electric current from one primary electrode to the other through the plates and single secondary electrode.

2. The structure defined in claim 1 in which the contact face of the secondary electrode has the same contour as the surface of the plate with which it engages.

3. The structure defined in claim 1 in which the contact face of the secondary electrode has the same contour as the surface of the plate with which it engages and covers an area that extends materially outward from the primary electrode and surrounds the same.

4. The structure defined in claim 1 in which the secondary electrode is mounted to turn about an axis that is substantially perpendicular to the plates and eccentric to the primary electrode.

5. In a welder, a welding circuit having a relatively movable electrode arranged to engage one side of a pair of plates to be welded, a pressure device arranged to engage the opposite side of the plates from said electrode, and a projector operative to move said electrode against the plates with an action that will yield transversely of the electrode under a predetermined pressure of the electrode against the plates.

6. In a welder, a welding circuit having a relatively movable electrode arranged to engage one side of a pair of plates to be welded, a pressure device arranged to engage the opposite side of the plates from said electrode, a projector for moving the electrode against the plates, and operating connections movable transversely of the electrode for rendering the projector operative or inoperative, said connections being arranged to produce a hammer-like action on the projector to overcome the inertia thereof for movement to an inoperative position.

7. In a welder, a support, a pressure device, means for intermittently moving the pressure device into engagement with one side of a pair of plates and press the same together and the work onto the support, and a welding circuit having an electrode arranged to engage the opposite side of the plates from the pressure device.

8. In a welder, a support, a pressure device, positive means for intermittently moving the pressure device a constant predetermined distance to engage one side of a pair of plates and press the same together and the work onto the support, and a welding circuit having a pair of spaced electrodes arranged to engage the opposite side of the plates from the pressure device.

9. The structure defined in claim 8 in which the positive means may be adjusted, at will, to vary the distance the pressure device is moved against the work.

10. The structure defined in claim 8 in further combination with projectors operative to move the electrodes against the plates with an action that will yield transversely of the electrodes and under a predetermined pressure of the electrodes against the plates.

11. The structure defined in claim 8 in further combination with projectors operative to move the electrodes against the plates with an action that will yield transversely of the electrodes and under a variable predetermined pressure of the electrodes against the plates.

12. In a welder, a support, a secondary electrode operable to engage one side of a pair of plates to be welded and press the same together and the work onto the support, a welding circuit having a pair of spaced primary electrodes arranged to engage the opposite side of the plates from the secondary electrode, and for passing an electric current from one primary electrode to the other through the plates and secondary electrode and be connected in series by said secondary electrode.

13. The structure defined in claim 12 in further combination with projectors operative to move the primary electrodes against the plates with an action that will yield transversely of the primary electrodes under a predetermined pressure of the primary electrode against the plates.

14. In a welder, a support, a secondary electrode operable to engage one side of a pair of plates to be welded and press the same together and the work onto the support, a welding circuit having a pair of primary electrodes arranged to engage the other side of the plates, projectors reacting against a part of the work on the support and operative to move the primary electrodes against the opposite side of the plates from the secondary electrode, and for passing an electric current from one primary electrode to the other through the plates and secondary electrode.

15. In a welder, a support, a secondary electrode, positive means for moving the secondary electrode a predetermined distance to engage one side of a pair of plates to be welded and press the same together and the work onto the support, and a welding circuit having a pair of spaced primary electrodes arranged to engage the opposite side of the plates from the secondary electrode, projectors reacting against a part of the work on the support and operative to move the primary electrodes against the opposite side of the plates from the secondary electrode, and for passing an electric current from one primary electrode to the other through the plates and secondary electrode.

16. In a welder, a support, a secondary electrode, positive means for moving the secondary electrode a predetermined distance to engage one side of a pair of plates to be welded and press the same together and the work onto the support, and a welding circuit having a pair of spaced primary electrodes arranged to engage the opposite side of the plates from the secondary electrode, projectors reacting against a part of the work on the support and operative to move the primary electrodes against the opposite side of the plates from the secondary electrode with an action that will yield under a predetermined pressure of the primary electrode against the plates, and for passing an electric current from one primary electrode to the other through the plates and secondary electrode.

17. In a welder, a support, a pair of feed rolls for holding a piece of work out of contact with the support, a pressure device operable to engage one side of a pair of plates to be welded and press the same together and to spring the work between the rolls onto the support, and a welding circuit having an electrode arranged to engage the opposite side of the plates from the pressure device, and a projector reacting against the part of the work sprung onto the support and operative to move the electrode against the plates.

18. In a welder, a pair of intermittently operated feed rolls for a piece of work having a pair of plates to be welded that are pressed together by said rolls, a pressure device, and a welding circuit having an electrode, said pressure device and electrode being arranged to engage opposite sides of the plates, said pressure device and electrode being intermittently moved against the plates in timed relation to the movement of the feed rolls.

19. In a welder, front and rear pairs of intermittently operated feed rolls for a piece of work clamped therebetween and having a pair of plates to be welded pressed together by the rolls of said pairs, a pressure device, and a welding circuit having an electrode, said pressure device and electrode being arranged to engage opposite sides of the plates between the pairs of rolls, said pressure device and electrodes being intermittently moved against the plates in timed relation to the movement of the feed rolls.

20. In a welder, a work support, a welding circuit having an electrode arranged to engage one side of a pair of plates to be welded, a pressure device arranged to engage the opposite side of the plates from the electrode and hold the work on the support, and means for moving the pressure device into and out of engagement with the plates while the work is on the support and for moving the electrode into and out of engagement with the plates while the pressure device is in engagement therewith.

21. In a welder, a work support, a welding circuit having a primary electrode and a combined pressure device and secondary electrode, said electrodes being arranged to engage opposite sides of a pair of plates held on the support by said pressure device, means for moving the secondary electrode into and out of engagement with the plates while on the support and for moving the primary electrode into and out of engagement with the plates while held on the support by the secondary electrode.

22. In a welder, an intermittently operated work feed device, a pressure device, a welding circuit having an electrode and a circuit breaker, said pressure device and electrode being arranged to engage opposite sides of a pair of plates to be welded, and automatic means having successive cycles of operation in timed relation and each thereof includes: first, moving the pressure device and the electrode into engagement with the plates; second, closing the circuit breaker for a predetermined period of time; third, moving the pressure device and electrode away from the plates; and fourth, operating the feed device to impart a step of movement to the plates to position the same for the next cycle of operation.

23. The structure defined in claim 22 in which the presser device is moved into engagement with the plates in advance of the electrode and in which the electrode is moved away from the plates in advance of the pressure device.

24. In a welder, a supply circuit, a welding circuit, a normally open supply switch for connecting the welding circuit to the supply circuit, and a switch circuit for closing the supply switch including a normally open actuating switch arranged to be closed by the engagement of a piece of work in the welder therewith and thus held until the work passes out of engagement therewith.

25. In a welder, a plurality of arms having electrodes on their free ends, said arms being movably mounted for individual movement into inoperative positions, and projectors reacting against one part of the work and operative to move the electrodes against another part of the work.

26. In a welder, a plurality of units each of which is for use in welding in a double row, each unit includes a pair of arms each having an electrode on its free end, said arms being movably mounted, whereby the arms of any one unit or a plurality thereof may be moved into inoperative positions, and projectors reacting against one part of the work and operative to move the electrodes against another part of the work.

27. In a welder, a plurality of units each of which is for use in welding in a double row, another unit for use in welding in a single row, each double unit includes a pair of arms each having on its free end an electrode, said single unit includes a single arm having on its free end an electrode, and projectors reacting against one part of the work and operative to move the electrodes against another part of the work.

28. In a welder, a plurality of units each of which is for use in welding in a double row, another unit for use in welding in a single row, each double unit includes a pair of arms each having on its free end an electrode, said single unit includes a single arm having on its free end an electrode, the arms of said double and single row units being movably mounted, whereby the arms of any one double row unit or a plurality thereof or the arm of the single row unit may be moved into inoperative positions, and projectors reacting against one part of the work and operative to move the electrodes against another part of the work.

In testimony whereof I affix my signature.

ARTHUR R. GROSS.